United States Patent
Spirig et al.

(10) Patent No.: US 11,797,758 B2
(45) Date of Patent: Oct. 24, 2023

(54) AUTOMATIC DATA ENTRY FOR FORM DATA STRUCTURES USING APPLICATION PROGRAMMING INTERFACES

(71) Applicant: Brex Inc., Draper, UT (US)

(72) Inventors: Milo Spirig, San Francisco, CA (US); Pratik Tandel, San Francisco, CA (US)

(73) Assignee: Brex Inc., Draper, UT (US)

( * ) Notice: Subject to any disclaimer, the term of this patent is extended or adjusted under 35 U.S.C. 154(b) by 0 days.

(21) Appl. No.: 17/878,722

(22) Filed: Aug. 1, 2022

(65) Prior Publication Data

US 2023/0004709 A1    Jan. 5, 2023

Related U.S. Application Data

(63) Continuation of application No. 17/364,215, filed on Jun. 30, 2021, now Pat. No. 11,403,459.

(51) Int. Cl.
| | |
|---|---|
| G06F 40/174 | (2020.01) |
| G06F 16/25 | (2019.01) |
| G06F 40/205 | (2020.01) |
| G06N 20/00 | (2019.01) |
| H04L 67/133 | (2022.01) |

(52) U.S. Cl.
CPC .......... *G06F 40/174* (2020.01); *G06F 16/258* (2019.01); *G06F 40/205* (2020.01); *G06N 20/00* (2019.01); *H04L 67/133* (2022.05)

(58) Field of Classification Search
None
See application file for complete search history.

(56) References Cited

U.S. PATENT DOCUMENTS

| | | |
|---|---|---|
| 11,163,586 B1 | 11/2021 | Mathur et al. |
| 2011/0225061 A1* | 9/2011 | Keith ............... H04M 3/42017 705/26.1 |
| 2011/0225636 A1* | 9/2011 | Keith ..................... G06Q 10/10 709/248 |
| 2013/0205189 A1* | 8/2013 | DiPierro ............... G06F 40/174 715/224 |
| 2016/0275454 A1 | 9/2016 | Shiryaev et al. |
| 2017/0041296 A1* | 2/2017 | Ford ..................... G06F 21/64 |
| 2017/0249592 A1 | 8/2017 | Rossi et al. |
| 2019/0141006 A1 | 5/2019 | Schnitt |
| 2019/0213618 A1 | 7/2019 | Ahluwalia et al. |
| 2021/0012355 A1 | 1/2021 | Bowers |

(Continued)

*Primary Examiner* — Ariel Mercado
(74) *Attorney, Agent, or Firm* — Haynes and Boone, LLP

(57) ABSTRACT

There are provided systems and methods for automatic data entry for form data structures using application programming interfaces. An entity, such as company or business, may want to onboard with a service provider that provides services to the entity, such as those associated with business credit, expense management, and the like. When onboarding, data entry to one or more digital form fields and structures may be required. In order to automate form filling based on data from disparate sources, the service provider may provide an external application programming interface (API) that receives API calls and converts and/or formats data for the fields and data structures of the digital form. The data entered to the fields and/or corresponding data structure may be stored in a specific database and tables as data structures retrievable for the digital form. When a referral token is received, the data may be retrieved.

20 Claims, 5 Drawing Sheets

(56) References Cited

U.S. PATENT DOCUMENTS

2021/0056084 A1   2/2021  Guha et al.
2021/0065576 A1   3/2021  Lillie et al.
2021/0360083 A1  11/2021  Duggal et al.
2021/0397784 A1* 12/2021  Grosse ................. G06F 40/174
2022/0021677 A1   1/2022  Lee et al.

* cited by examiner

AUTOMATIC DATA ENTRY FOR FORM DATA STRUCTURES USING APPLICATION PROGRAMMING INTERFACES

CROSS-REFERENCE TO RELATED APPLICATION

This application is a continuation of U.S. patent application Ser. No. 17/364,215, filed Jun. 30, 2021, all of which is incorporated by reference herein in its entirety.

TECHNICAL FIELD

The present application generally relates to application programming interfaces (APIs) that automate data processing between disparate systems and more specifically to using an API to automate data entry and processing for digital forms.

BACKGROUND

Service provider systems may provide services to customers, such as businesses and companies, through computing systems and networks. These services may include credit or loan underwriting that may extend a credit balance or load to customers, including business entities. When initially onboarding a customer or client entity, the customer may be required to provide initial entity data, including information about financial accounts and financial statuses of the entity and formational documents and information for the entity. For example, the entity may be required to provide information from articles of incorporation, tax status, an employer identification number (EIN), and the like. However, manual input of this data is time consuming and requires numerous inputs to a digital form. This further requires additional processing time to verify the data that is provided by the entity, and requires additional risk analysis, which consumes processing resources while taking additional time.

Therefore, there is a need to address deficiencies with conventional computing systems used by service providers to automate data entry and processing between systems to reduce data processing times and required inputs.

Figure 1:
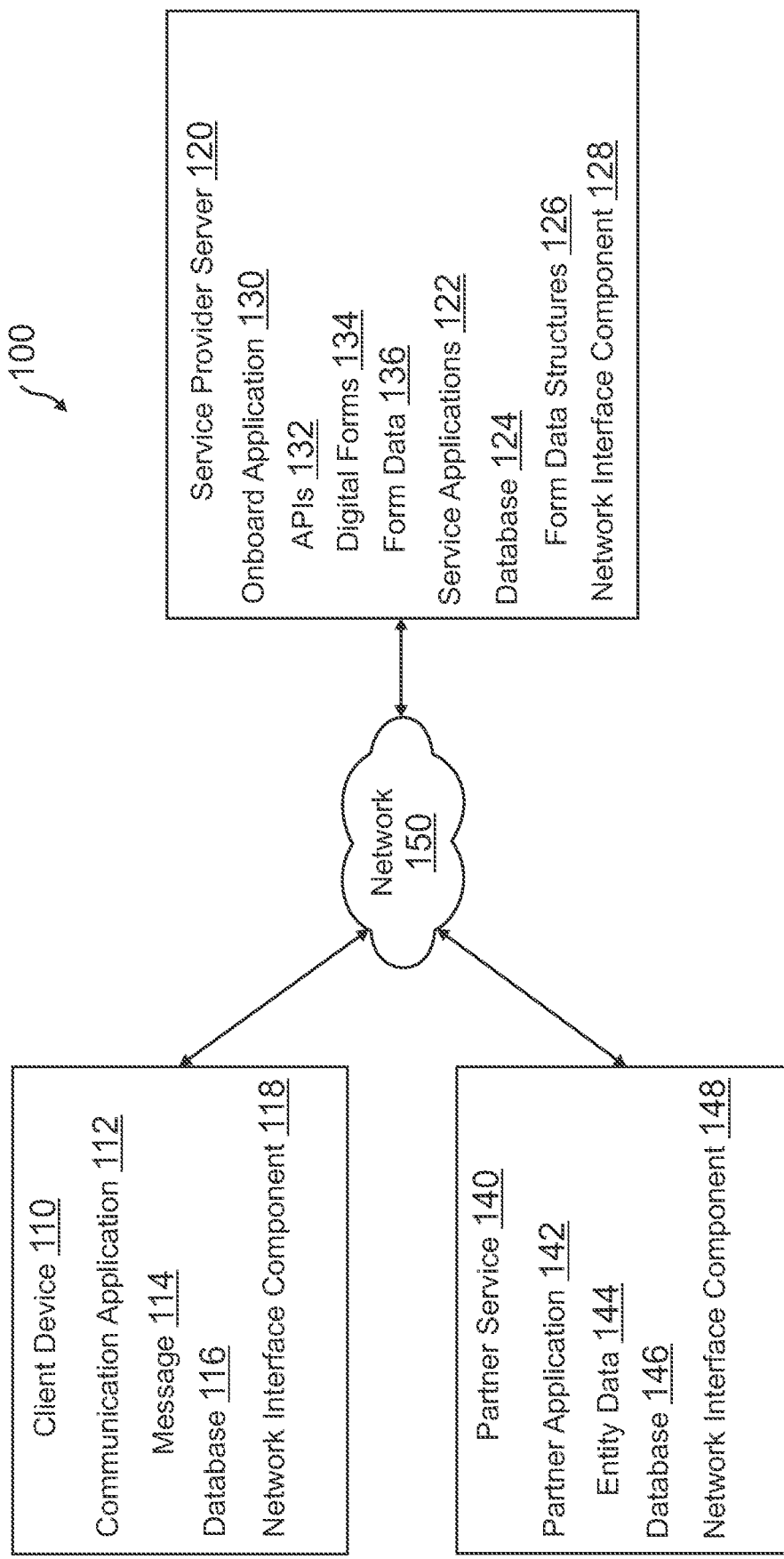
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for automatic data entry for form data structures using application programming interfaces. Systems suitable for practicing methods of the present disclosure are also provided.

In service provider systems, such as credit provider systems and other financial service providers, underwriting systems may be utilized to extend credit or other loaned customers and other entities, such as businesses and companies, based on risk assessment and risk analysis processes performed by the service provider systems. With new companies, such as start-up businesses and enterprises, credit extension and onboarding with a service provider may require significant data, which may take time to verify and require significant processing resources. Further, the start-up businesses may have different and difficult to ascertain resources, which may further affect onboarding of new entities. In order to solve these issues with data entry and verification for onboarding systems, the service provider may customize and deploy one or more application programming interfaces (APIs) that specifically integrate and communicate data with partner service providers, such as an incorporation firm that provides business incorporation services, to automatically obtain verified and validated data that may be input to one or more digital forms. These forms may correspond to data structures that include the received information. This further provides automatic transmission of electronic communications to complete form filling and onboarding of the entity with the service provider.

An online service provider may provide an account, credit, and/or expense management system that may provide data aggregators that receive and monitor data for an entity, as well as connect with one or more financial computing systems for financial accounts. The financial accounts may include one or more credit accounts, debit cards, direct debit/credit through automated clearing house (ACH), wire transfers, gift cards, and other types of funding sources that may be issued to the entity by the online system and/or other financial service providers (e.g., banks). Thus, a networked system and provider may include a framework and architecture to provide payment gateways, billing platforms, eCommerce platforms, invoicing, and additional services. For example, a credit provider system may offer services, software, online resources and portals, and infrastructure used to onboard an entity and provide access to these services to the entity.

In this regard, an entity, such as a company or other organization, may request onboarding with a credit service provider, for example, to open and/or receive a loan or credit account that provides one or more payment cards or other financial accounts to the entity. These accounts and/or payment cards may be used by employees, management, and the like of the entity to process payments. Conventionally, the entity may be onboarded by providing necessary documents to verify the entity's identity and/or business standing, such as incorporation documents, EIN, tax status and/or documents, and the like. The entity may also provide data regarding the entity's financial status, accounts, and balances, such as initial seed money, investments, and global available balance(s) that may be used for repayment of extended credit or loans. In this regard, the entity may provide access or a link to data, such as through an integration with one or more banking systems utilized by the entity for one or more available balances of funds. This data may be provided through uploading data and/or entry of input to a digital form. However, this is time consuming, requires data processing and network communication resources, and further requires data confirmation and validation, which wastes additional data processing resources and time.

In order to expedite digital form filling and data uploading of data required for uploading, a credit and/or expense management service provider may provide an automated form filling API and operations. The service provider may generate and deploy an onboarding API specifically for a partner service provider, such as an incorporation firm, tax and/or financial account provider, or the like. The API may be specifically configured to interface with the computing systems of the partner service provider, such as by allowing for API calls and data exchanges between the internal systems of the service provider and the external computing systems of the partner service provider. The API may be specifically configured and deployed for the computing infrastructure and systems of the partner service provider, which may allow for receiving and/or converting data into data structures and data formats compatible with the internal computing services of the service provider requiring the onboarding.

Thereafter, the service provider may utilize an authorization and authentication protocol and framework that allows servers and services of the partner service provider to be authenticated with the service provider. For example, oAuth may be used as an authorization standard and protocol to allow the partner service to access and/or exchange information with the service provider. This enables the partner service provider to allow authenticated access and use of the service provider's computing systems and services. In this regard, once authenticated, the partner service provider may then provide data to the service provider for an entity that is being referred to the service provider for onboarding and obtaining service provided by the service provider. The data may include information from one or more documents completed with and/or uploaded to the partner service provider for the entity. For example, the data may include one or more incorporation documents, tax and/or financial account documents or data (e.g., tax status, employer identification number (EIN) or other tax identification, IRS EIN filings or applications, etc.), certificates of good standing, company documents, or the like. In this regard, the partner service provider may receive the data when providing one or more services to the entity by the partner service provider. When the data is provided to the service provider, a referral code identifying the data and the entity may be generated and assigned to the entity for data stored in one or more databases.

The onboarding API of the service provider's computing system may be accessed through one or more API integrations with the computing system of the partner service provider in order to share the data for the entity between the computing systems. The partner service provider may therefore execute one or more API calls to the onboarding API, which may include a data loading in one or more data containers for network communications exchanged via the API calls. Thus, the onboarding API may receive one or more API calls having the corresponding data for the entity from the partner service provider. The onboarding API and the onboarding computing systems of the service provider may then parse the data to identify what information is available in the received data for the entity, and where the data is correspondingly entered to a digital form for onboarding the entity with the service provider. In certain embodiments, the data in the API call(s) may specifically designate the data and the corresponding field of a digital form. For example, the onboarding API may designate data from different fields or placements in received documents or may receive data in specific formats used by the onboarding operations of the service provider.

However, in other embodiments, the data may be converted by the onboarding API and/or partner service provider system to one or more data structures that are capable of processing and/or for entry to specific fields of a digital form used to onboard the entity with the service provider. This may include using intelligent machine learning (ML) models and/or data extraction operations (e.g., text extraction, image processing, optical character recognition (OCR), and the like). Once the data is in one or more data structures capable of being handled by the onboarding API and/or onboarding operations of the service provider, the service provider may begin automated form filling using the data in the data structures. This may include adding the data into one or more digital form fields and generating a digital form data structure for the digital form. The digital form may be stored in a database of the service provider for use with the prefilled data that has been automatically entered to the digital form based on the data received from the partner service provider. Further, a generated referral code for the entity may be associated with the digital form for storage and later retrieval by the entity, the service provider, and/or the partner service provider for processing and completion. The referral code for the referral by the partner service provider may also be shared back with the partner service provider's computing system using the API and one or more API calls executed between the two computing systems.

Once the digital form has partially or completely been prefilled using the data from the partner service provider, such as after parsing and converting the data into usable data formats and structures with the digital form, the service provider may transmit an electronic communication or message to the entity. The message may be transmitted to a digital address for the entity, which may be received from the partner service provider with the entity's data. The message may include a link to a universal resource location or identifier (URL or URI), which may allow retrieval of the digital form and/or may present a webpage or interface having the digital form with prefilled data automatically entered. The message may also or instead include an attachment for the digital form and/or may provide the digital form in a body of the message having the interface fields that are prefilled. In further embodiments, the message may correspond to an email notification to an email address of the entity and/or used by a member of the entity (e.g., founder, administrative department or personnel, etc.). The message may further identify additional required data for the message.

Based on the digital form, the service provider may reduce risk analysis and/or risk data processing for the entity based on the entity's organizational data being received from the trusted partner service provider. Since the data is being received from a trusted source, the data may not be required to be validated and/or the validations reduce steps, processing, or risk threshold requirements. The credit provider system may provide an electronic data processing framework that integrates into a payment network and/or computing system of a financial service provider at a point that allows for real-time data acquisition and/or processing of transactions once onboarded. Additionally, the system's framework may integrate with one or more client devices (e.g., personal computers, mobile devices, etc.), online scheduling resources, personnel management systems, and/or enterprise business software to receive data for an entity. Thus, risk processes to provide these services may be reduced.

In further embodiments, a real-time bidirectional link between the computing systems of the service provider and partner service provider may provide automated updating of form filling status and requirements, such as whether the entity has been onboarded. This may include provide a completion status, where completion of onboarding of the entity may provide a reward to the partner service provider from the service provider. The bidirectional link may be used to update messages by the partner service provider with the entity for completion and/or referral, such as by removing any webpage banners and/or messages transmitted between the partner service provider and the entity for referring the service provider for services. These may be exchanged through additional API calls and the like of the onboarding API and system.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a customer or client device 110, a service provider server 120, and a partner service 140 in communication over a network 150. A user (not shown) may correspond to an employee, contractor, shareholder, or other suitable person of a company (not shown and generally referred to herein as an "employee") associated with client device 110, which may be used to onboard the entity with service provider server 120. Service provider server 120 may automatically prefill a digital form for the onboarding based on data exchanged with partner service 140.

Client device 110, service provider server 120, and partner service 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be utilized by an employee of an entity or company that employs one or more users, for example, to perform onboarding for credit and/or account services with service provider server 120. For example, in one embodiment, client device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In this regard, client device 110 includes one or more processing applications which may be configured to interact with service provider server 120 to onboard a user for credit, expense management, and/or account service provided by service provider server 120. Although only one communication device is shown, a plurality of communication devices may function similarly.

Client device 110 of FIG. 1 includes a communication application 112, a database 116, and a network interface component 118. Communication application 112 may correspond to executable processes, procedures, and/or applications with associated hardware. In other embodiments, client device 110 may include additional or different modules having specialized hardware and/or software as required.

Communication application 112 may be implemented as specialized hardware and/or software utilized by client device 110 to provide data for an onboarding with service provider server 120 of an entity associated with client device 110 (e.g., an organization, business, company, or the like including startup companies that may require credit services). This may include providing information for the entity necessary to establish the account, such as a credit account for an entity associated with client device 110 that is managed and provided by service provider server 120. In this regard, communication application 112 may correspond to software, hardware, and data utilized by a user associated with client device 110 to enter, store, and process data associated with an account, which may be based on a received partial or complete prefilled digital form having entity organization data, financial data, and the like in one or more field of a digital form data structure.

In various embodiments, communication application 112 may include a general browser application configured to retrieve, present, and communicate information over the Internet (e.g., utilize resources on the World Wide Web) or a private network. For example, communication application 112 may provide a web browser, which may send and receive information over network 150, including retrieving website information, presenting the website information to the user, and/or communicating information to the website, including payment information. However, in other embodiments, communication application 112 may include a dedicated application of service provider server 120 or other entity, which may be configured to assist in establishing and maintaining accounts and performing onboarding for accounts and services provided by service provider server 120.

In various embodiments, communication application 112 may receive a message 114 from service provider server 120, which may include a redirection link to a data structure or other data stored by service provider server 120 for a digital form that has been prefilled with all or a partial amount of data necessary to perform onboarding of an entity associated with client device 110 with service provider server 120. For example, client device 110 may be used by an employee, management, founder, executive, investor, or the like of the entity. Message 114 viewed via communication application 112 may include a redirection link to the digital form in viewable form, such as through a retrieval of the stored fields and/or data from a reference token or code for a link in message 114. When viewing the digital form, one or more fields may be prefilled based on data from partner service 140 and completion of the form may allow for submission and onboarding/rejection with service provider server 120. In other embodiments, message 114 may include an attachment and/or the prefilled form within a body of message 114, where fields may be prefilled and/or may require data, which may be provided back to service provider server 120 in an attachment of the digital form or via data entry to message 114, respectively.

The onboarding data required in the digital form from message 114 may be prefilled and/or required for entry when accessed via message 114 for a soft-signup (e.g., only partial data is provided) and later confirmation and onboarding. The onboarding information may include entity organizational data, formational data, and/or incorporation data, such as information that may be generated, received, and/or processed by partner service 140 (e.g., articles of incorporation and/or certificates of good standing as may be issued by a secretary of state for a state). Such data may include tax information, such as an IRS EIN application and/or confirmation. The onboarding data required to be entered and/or verified in the digital form accessible via message 114 may also correspond to global available funds for the entity associated with client device 110 and other financial information. For example, transaction histories, investments, bank balances and statements, financial accounts, and/or funding information for a business may be required.

Communication application 112 may retrieve and/or access this data from an external financial institution or computing system. Communication application 112 may be integrated with service provider server 120 so that data may be shared with service provider server 120 for entity organizational and/or transactional data, for example, by providing the information via a data sharing process and/or entry or confirmation in a digital form. In further embodiments, communication application 112 may access an online platform and database that provides data and/or permit service provider server 120 access to the data with the online platform, such as by providing information to allow access to the data using an integration between computing systems for another partner service provider and/or financial system and service provider server 120.

Client device 110 may further include database 116 stored in a transitory and/or non-transitory memory of client device 110, which may store various applications and data and be utilized during execution of various modules of client device 110. Thus, database 116 may include, for example, identifiers such as operating system registry entries, cookies associated with communication application 112, identifiers associated with hardware of client device 110, or other appropriate identifiers, such as identifiers used for payment/account/device authentication or identification. Database 116 may include entity data and the like, which may be uploaded, automatically or on command, for entry to a digital form used for onboarding.

Client device 110 includes at least one network interface component 118 adapted to communicate with service provider server 120, partner service 40, and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices.

Service provider server 120 may be maintained, for example, by an online service provider, which may provide onboarding services for account, payment instruments and credit, and/or expense management services to companies, businesses, and other entities. In this regard, service provider server 120 includes one or more processing applications which may be configured to interact with client device 110, partner service 140, and other devices or servers to facilitate onboarding for provision of the services. In one example, service provider server 120 may be provided by BREX®, Inc. of San Francisco, Calif., USA. However, in other embodiments, service provider server 120 may be maintained by or include other types of credit providers, financial services providers, and/or other service provider, which may provide services to companies.

Service provider server 120 of FIG. 1 includes an onboarding application 130, service applications 122, a database 124, and a network interface component 128. Onboarding application 130 and service applications 122 may correspond to executable processes, procedures, and/or applications with associated hardware. In other embodiments, service provider server 120 may include additional or different modules having specialized hardware and/or software as required.

Onboarding application 130 may correspond to specialized hardware and/or software to allow entities (e.g., the entity associated with client device 110) to onboard with service provider server 120 in order to receive services provider by service provider server 120, such as account, credit, expense management, and other services. In some embodiments, the services may be used receive payment instruments associated with a bank account, extended credit, and/or funding of the company, such as one or more company credit cards. Onboarding application 130 may further provide management for those issued payment instruments and additional funds/accounts of the company, for example, through expense management processes. In this regard, an entity may first establish an account with onboarding application 130 by providing company or entity data and onboarding through onboarding application 130. The company or entity data may include articles of incorporation data and forms, tax status and/or IRS EIN request and confirmation data, certificate of good stating data, and other information that may be utilized to verify a company, business, organization, or charity is proper, valid, and not fraudulent. Such information may further include bank account and funding information, such as verified funding from investors, available funds in a bank or financial account, and the like. The information may be entered, uploaded, provided, and/or processed using one or more of digital forms 134 accessible through a website or application provided by service provider server 120 and/or onboarding application 130.

If qualified based on policies, rules, and/or models, service provider server 120 may onboard the entity associated with client device 110 for services provided by service provider server 120. This may include providing account and/or expense management services, such as based on expenses and balances available to the entity. Further, credit may be extended to the entity based on entity financial data. In this regard, service provider server 120 and/or another issuing entity may provide a payment instrument that is managed by service applications 122. For example, service provider server 120 may issue one or more credit cards for employees of the entity, which may correspond to a real or virtual credit card or other types of payment instruments and instrument identifiers that may be used for company payments.

However, filling out digital forms 134 and requesting onboarding may take significant inputs, data transmissions and uploading, and/or time (including data entry and/or data processing time) to complete and verify. Further, verification may take time and processing resources to properly verify the supplied data in digital forms 134. Onboarding application 130 may further include APIs 132 that may be used to interface with partner service 140 and/or other partner service providers, for automatic digital form filling and data entry into data fields and data structures for digital forms 134. This may be used to automatically enter form data 136 to one or more digital forms from data supplied by partner service 140 via an API integration and API calls instead of requiring manual data entry.

For example, APIs 132 may be specifically generated for one or more partner service providers and may provide for an integration with the partner service provider(s) via external-facing APIs allow for API calls to be exchanged have data payloads for processing with digital forms 134. APIs 132 may be specifically generated to handle data formats and/or convert to specific data formats and/or data structures for the data payloads received from the partner service providers. In this regard, partner service 140 may provide data, such as entity data 144, to onboarding application 130 for automatically prefilling one or more of digital forms 134. The aforementioned data required for onboarding of an entity associated with client device 110 may be received from partner service 140 via the corresponding one of APIs 132, and one or more fields of a digital form from digital forms 134 may be automatically filled with the corresponding data.

Once prefilled, onboarding application 130 may transmit an electronic communication or message to client device 110 and/or another device or digital address (e.g., email address) for the entity, which may request finalizing the digital form and/or approving the digital form for submission and onboarding. However, in other embodiments, partner service 140 may transmit the message, such as an email, to the entity and/or may alert the entity of the availability to onboard with service provider server 120 via an interface, dashboard, banner, or the like through an account or portal provided by partner service 140. Thus, the corresponding one of APIs 132 may be used to provide back an electronic communication, referral token or code, or the like, which may be used by partner service 140 for referrals. Onboarding application 130 may maintain or utilize a bidirectional link via the API to update partner service 140 of a status for completion of the digital form for the entity, as well as provide a referral payment or bonus when the digital form is completed.

Service applications 122 may correspond to specialized hardware and/or software to allow entities (e.g., the entity associated with client device 110) to provide account services, process and provide credit or loan extensions, process financial transactions using one or more company credit cards or other financial instruments, and/or provide expense management systems. Service applications 122 may therefore correspond to one or more services provided by service provider server 120 to an entity, such as the entity associated with client device 110 after onboarding the entity via onboarding application 130. In some embodiments, the services may include account and/or credit services. In such embodiments, service applications 122 may include underwriting systems and models, which may extend credit or other loans based on parameters for an entity. In further embodiments, service applications 122 may also provide expense management services, such as those that may integrate with an entity's expense, payroll, human resources, business panning, and the like to provide enterprise resource planning (ERP) services.

In some embodiments, service applications 122 may be used to process transaction data, which may include information about the transaction (e.g., cost, items, additional fees including tax or tip, merchant identifier, description, and the like) and an identifier for the entity associated with client device 110 and/or the used payment instrument (e.g., credit card number for the credit account). Service applications 122 may then utilize one or more payment networks to process the transaction, such as by issuing a payment over a payment network and/or by requesting payment by a credit issuing bank or institution to the merchant and/or acquiring bank or institution. In other embodiments, the credit card and payment network may be managed by another entity and/or payment network, where an integration by service provider server 120 with the network may allow for acquisition of transaction data by service applications 122 in real-time or substantially in real-time. Service applications 122 may further issue transaction histories and provide accounting and recordation of transaction data, such as with the ERP resources provided by service applications 122.

Additionally, service provider server 120 includes database 124. As previously discussed, the user, entity, and/or entity corresponding to client device 110 may establish one or more accounts with service provider server 120, which may require form data 136 for onboarding. Accounts in database 124 may include customer credit accounts and other entity information, such as name, address, entity organization and/or formational information (e.g., incorporation, tax, and/or good standing documents), funding information (e.g., bank balances and/or incoming funding), additional user financial information, and/or other desired entity data.

In various embodiments, service provider server 120 includes at least one network interface component 128 adapted to communicate with client device 110, partner service 140, and/or other devices or servers over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices.

Partner service 140 may correspond to a computing system and/or network utilized by a partner service provider for service provider server 120. This may include incorporation firms, tax firms or services for establishing company taxation statuses and EINs, firms providing company statuses and standings (e.g., certificates of good standing for corporations and the like), banks and/or financial account service providers, and the like. Partner service 140 may further provide processing and resolution of entity data for an entity associated with client device 110, such as incorporation, taxation, and/or banking services. In this regard, partner service 140 may provide one or more accounts, dashboards, and/or interfaces where entities may submit entity data for processing, as well as view the results of the requested data processing for services and/or referrals for other services including those provided by service provider server 120. Although only one partner service is shown, a plurality of partner service providers and their corresponding computing systems may function similarly and include API integrations with service provider server 120 via APIs 132.

Partner service 140 of FIG. 1 includes a partner application 142, a database 146, and a network interface component 148. Partner application 142 may correspond to executable processes, procedures, and/or applications with associated hardware. In other embodiments, partner service 140 may include additional or different modules having specialized hardware and/or software as required.

Partner application 142 may correspond to specialized hardware and/or software to allow businesses, companies, and other entities to register of a company, such as incorporate via articles of incorporation, obtain EINs and/or register taxation statuses and documents, obtain business standings and the like, open, maintain, and utilize bank accounts or obtain other business services. In some embodiments, partner service 140 may processes to utilize business formation and/or organization services and/or make formational and/or organization data for businesses available for retrieval and/or transmission to other entities. This may also or instead include services associated with taxation statuses and obtaining taxation numbers (e.g., an EIN or the like), as well as view entity statuses (e.g., good standing statuses with secretaries of state and the like). In further embodiments, include or be connected with an online banking resource for a bank utilized by client device 110 and/or service provider server 120 to maintain available balances and provide payments. However, in other embodiments, partner application 142 may correspond to other types of payment networks and payment types, such as direct debit payments (ACH payments), wire exchanges or payments, prepaid card payments, or regionally/company-specific payments.

When utilizing these services, entity data 144 may be generated and/or received. Entity data 144 may further correspond to data that may be processed by service provider server 120 when entered to a digital form and/or provided for an onboarding process. For example, entity data 144 may include entity organizational and/or formational data for the entity that may be required to prove the entity is a valid company, business, or the like. Thus, entity data 144 may be provided to service provider server 120 for processing. When providing entity data 144 to service provider server 120, all or a portion of the entity data, such as data required in a digital form for onboarding, may be provided through an API call to one of APIs 132 for onboarding application 130. Authentication to share data may be provided through oAuth or the like, where client credentials may be tokenized and/or provided by partner service 140. The data may be converted by the API and/or formatted for the API. In some embodiments, entity data 144 may be provided as a Javascript Object Notation (JSON), JSONB, or other data container with the API call having a data payload for entity data 144. A referral response may be created and provided back to partner service 140, which may include a referral token and/or code. In some embodiments, partner application 142 may be used to output a notification to the entity, such as via a digital communication, dashboard icon or banner, and the like.

Partner service 140 may further include database 146 stored in a transitory and/or non-transitory memory of partner service 140, which may store various applications and data and be utilized during execution of various modules of partner service 140. Thus, database 146 may include, for example, identifiers such as operating system registry entries, identifiers associated with hardware of partner service 140, or other appropriate identifiers, such as identifiers and credentials used for data and account identification and/or authentication. Database 146 may include entity data 144 used to onboard a customer with service provider server 120.

Partner service 140 includes at least one network interface component 148 adapted to communicate with client device 110, service provider server 120, and/or another device or server. In various embodiments, network interface component 148 may include a DSL (e.g., Digital Subscriber Line) modem, a PSTN (Public Switched Telephone Network) modem, an Ethernet device, a broadband device, a satellite device and/or various other types of wired and/or wireless network communication devices.

Network 150 may be implemented as a single network or a combination of multiple networks. For example, in various embodiments, network 150 may include the Internet or one or more intranets, landline networks, wireless networks, and/or other appropriate types of networks. Network 150 may correspond to small scale communication networks, such as a private or local area network, or a larger scale network, such as a wide area network or the Internet, accessible by the various components of system 100.

Figure 2:
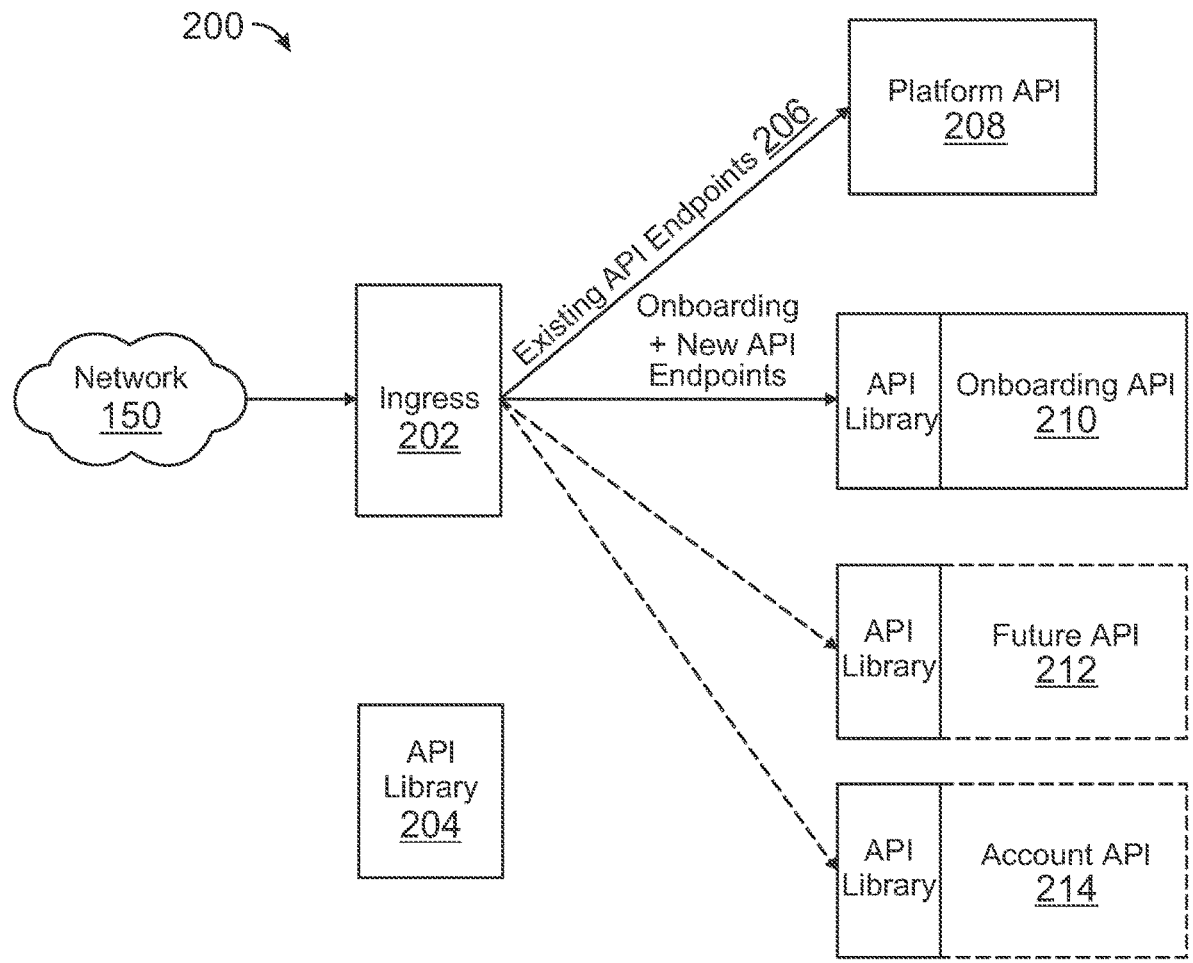
FIG. 2 is an exemplary system architecture for application programming interfaces used to interface with partner services providers to automatically perform data entry and filling within form data structures, according to an embodiment.

FIG. 2 is an exemplary system architecture 200 for application programming interfaces used to interface with partner services providers to automatically perform data entry and filling within form data structures, according to an embodiment. System architecture 200 includes network 150 that may allow for interaction with an ingress 202 of a service provider, such as a device, server, or cloud computing compute(s) of service provider server 120 discussed in reference to system 100 of FIG. 1. In this regard, ingress 202 may correspond to an API object or the like of an API (e.g., one of APIs 132 in system 100) that provides and manages external access to services of service provider server 120 and/or APIs 132.

In this regard, ingress 202 may provide for load balancing, secure socket layer (SSL) processes, and the like when receiving API calls to the service provider from external sources, such as partner service providers. Ingress 202 may be utilized to expose network traffic routes from network 150 to the APIs within the service provider's system and/or computing architecture, for example, to allow API calls from external partner service computing systems to the APIs of the service provider's system. This may include Hypertext Transfer Protocol (HTTP) and HTTPS traffic from network 150 to the APIs of the service provider. Ingress 202 may utilize an API library 204 that may provide authentication and authorization mechanism and filtering, as well as designations of different APIs for the service provider's computing system. This may include designation of authentication parameters and techniques for authentication of external service providers, such as through oAuth, oAuth2 (or oAuth 2.0), and/or secure partner tokens.

The secure partner tokens may be required to trust data from external partner services and service providers. In this regard, a trusted partner service provider may execute a call to an authentication server and/or system via ingress 202 to receive a secure partner access token, which may be issued to the partner service provider for usage and authentication when performing onboarding operations and data transmissions of customer and entity data for onboarding. The secure partner tokens may be secure (e.g., an oAuth access token) and may be used for providing customer and entity data for referrals, but do not allow access to other accounts and data (e.g., other unknown customers and/or entities onboarding with the service provider). API library 204 may further designate a file and data interchange format to transmit data objects and data containers, such as JSON or JSONB used for processing with digital forms for data entry in one or more digital form fields and/or data formats and containers.

Ingress 202 may provide data to existing API endpoints 206, such as a platform API 208 of the service provider. This may include existing API endpoints that provide platform APIs for one or more services. However, with a configured onboarding system and APIs discussed herein, ingress 202 may instead route to one or more of an onboarding API 210, a future API 212, and/or an account API 214. A new API service may host new API endpoints for onboarding API 210, future API 212, and/or account API 214 using API library 204 that may be shared for custom configured API services and endpoints for onboarding services via prefilled digital forms, as well as future API services and endpoints. The APIs may be grouped by a particular product domain, such as onboarding for onboarding API 210, another future API service for future API 212, account services for account API 214, as well as other services such as accounting, expense management, underwriting and credit services, and the like. Further, prior to existing services having a particular product domain API, communications may be routed to existing API endpoints 206 prior to migration. This may include updating and configuring ingress 202 as a controller to perform load balancing and routing based on new code paths to new APIs for API calls, which may be switchable (e.g., on or off) to test issues with implementation and/or when deleting existing API code from platform API 208 after switchover.

Figure 3:
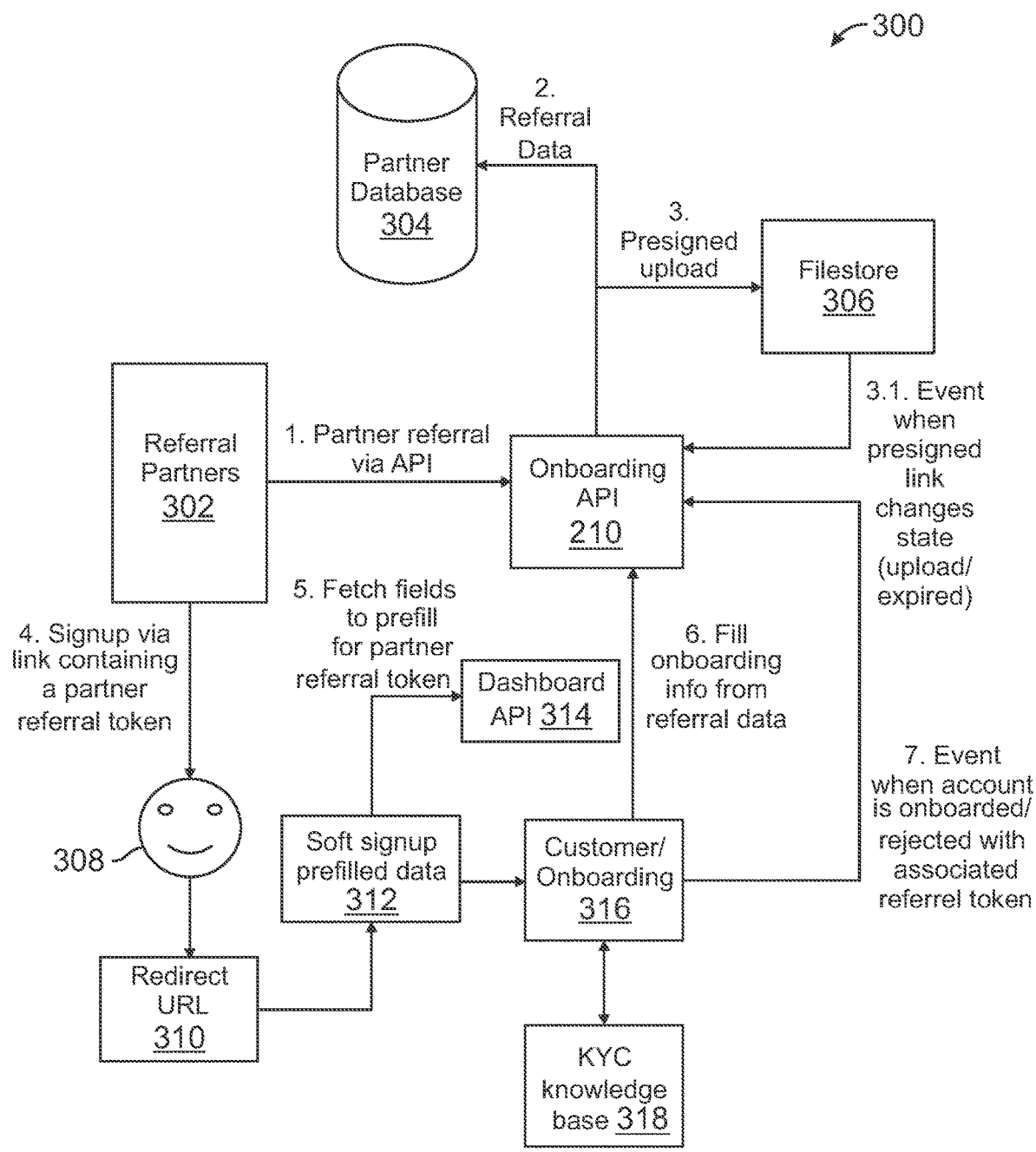
FIG. 3 is an exemplary diagram of service provider interactions with a partner service provider to provide automated data entry and filling within form data structures for onboarding, according to an embodiment.

FIG. 3 is an exemplary diagram 300 of service provider interactions with a partner service provider to provide automated data entry and filling within form data structures for onboarding, according to an embodiment. Diagram 300 of FIG. 3 includes a representation of a process to provide automated form filling and onboarding through a customized and/or configured API service and endpoint provided by service provider server 120 using onboarding application 130 discussed in reference to system 100 of FIG. 1. In this regard, diagram 300 may be executed through API endpoints and calls to exchange data as discussed with regard to system 100 and system architecture 200 of FIG. 2, for example, using onboarding API 210 discussed in reference to system architecture 200.

Diagram 300 includes onboarding API 210 which may interact with referral partners 302 to provide referrals for customer entities to onboard and obtain services provided by a service provider associated with onboarding API 210. Onboarding API 210 may correspond to an onboarding API service and/or onboarding API endpoint(s) that provide a standardized API for each referral partner. As such, onboarding API 210 may include a customized and standardized API specifically for each of referral partners 302, which may allow for conversion of data structures and formats for received referral data, such as entity data, to the data formats, standards, and structures that may be handled by the corresponding service provider providing onboarding API 210. Thus, at interaction 1, a partner referral occurs via an API endpoint for a specific referral partner (e.g., a partner service provider that may provide services to companies and businesses that may also utilize services of the service provider associated with onboarding API 210). Prior to or when providing referral data for an entity at interaction 1, an authentication may occur, such as through a previously generated secure partner token provided to the partner service (e.g., an oAuth token).

Referral data may be transmitted through an API call having a data payload, which may be converted for handling by onboarding API 210 with digital forms and field for data entry and prefilling. Thus, in some embodiments, different API endpoints for different ones of referral partners 302 may have different data conversion, data formatting, and/or data structure requirements for the referral data. Referral data from referral partners 302 may correspond to entity data having one or more incorporation documents, tax and/or financial account documents or data (e.g., tax status, employer identification number (EIN) or other tax identification, IRS EIN filings or applications, etc.), certificates of good standing, company documents, or the like. Further, referral data from other referral partners may include financial data and the like that may be used for partial or complete form filling when providing a prefilled form for onboarding to a potential customer entity.

At interaction 2, referral data is stored in a partner database 304, which may be in one or more data structures for handling with digital data forms for onboarding of customer entities with the service provider utilizing onboarding API 210 for onboarding and automated form filling. Partner database 304 may be used for storage of referral data (e.g., an entity's data for entry in a form for attempted onboarding). When prepared and/or at certain processing job intervals (e.g., at a certain time period for execution of uploading and form filling jobs), interaction 3 occurs where a presigned upload of the referral data is performed to a filestore 306. In various embodiments, the presigned upload may be a presigned S3 upload, such as using Amazon S3®, or another service that provides object storage. Filestore 306 may correspond to a storage pool or partition for file storage of the presigned upload, where at a sub-interaction 3.1, an event occurs when a presigned link changes state, such as if uploaded for object storage and linking via a weblink (e.g., a URL or URI) or becomes expired. If the referral data for the entity is successfully linked, a referral token may be generated and the referral token and/or link for the referral may be provided to the corresponding one of referral partners.

At interaction 4, a signup having a link containing the partner's referral token and/or referral link is transmitted to a customer entity 308, which may be a potential customer or other entity that may be onboarded with the service provider for services. This may include a redirect URL 310, which may redirect customer entity 308 to a soft signup having prefilled data 312. Redirect URL may utilize the referral token and/or referral link to access a webpage or the like that may provide processes for completing a digital form. However, to expedite form filling and automate data entry in particular fields for customer entity 308's data, at interaction 5, data is fetched for fields to prefill for the partner's referral token to customer entity 308. Soft signup prefilled data 312 may be obtained by interacting with a customer/onboarding 316 process, which may access a know your customer (KYC) knowledge base 318 to verify referral data for the entity and/or add additional data from available KYC data.

Interaction 6 by customer/onboarding 316 with onboarding API 210 thereafter retrieves the referral data for customer entity 308 through onboarding API 210. The referral data may be retrieved and/or loaded to digital form and/or interface fields and elements using the referral data from partner database 304 and/or filestore 306. Thereafter, a dashboard API 314 may be presented with the digital form with partially or completely filled data fields and entity data may be presented for onboarding and decision-making of whether to onboard customer entity 308. Further, when providing the prefilled form and/or adjudicating an onboarding request by customer entity 308, exceptions may be granted, and additional favor may be provided, as the data from referral partners 302 may be considered more trustworthy. Thus, risk analysis and fraud data processing may be reduced based on the trusted referral data.

At an interaction 7, an event occurs when an account in onboarded or rejected with an associated referral token. For example, a real-time/bidirectional link may be maintained between onboarding API 210 and referral partners 302 may be maintained to update referral partners 302 of any changes to a status of a referral to a customer entity having the prefilled form for onboarding. If changes are made, such as if the customer entity being referred to the service provider for onboarding via onboarding API 210 submits their application and digital form, a callback or webhook may be used to update the status. This may cause referral partners 302 to discontinue display of a link to sign up to the service provider, view their referral token, code, or weblink, and/or receive electronic communications informing the entity to sign up with the service provider via the prefilled form. Additionally, referral partners 302 may be provided a payment, credit, or bonus for the referral. This may be provided after submission of an onboarding digital form, approval, or the like, and may be immediate bonuses or accrued over a time period (e.g., to obscure which entities have performed onboarding).

Figure 4:
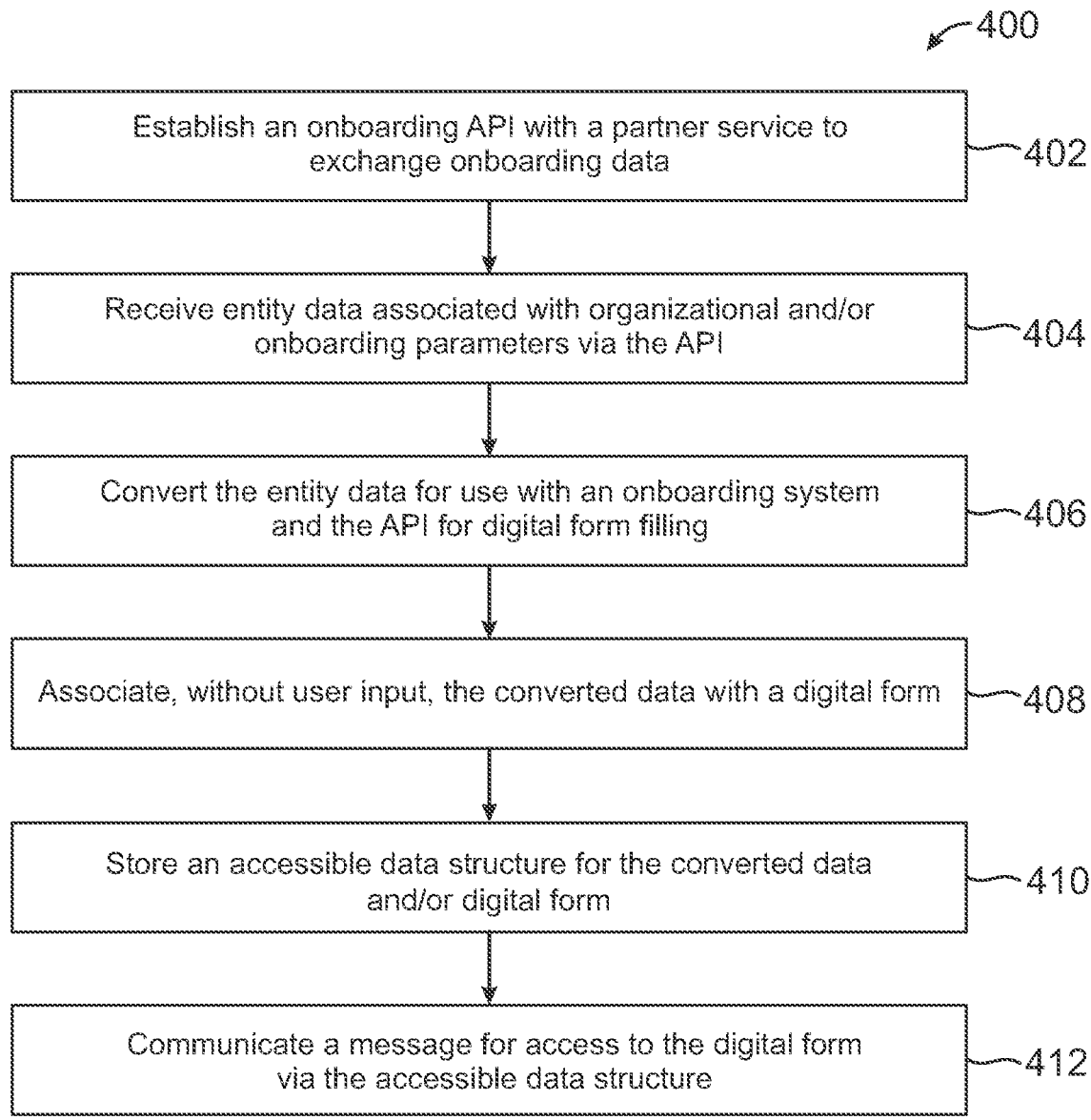
FIG. 4 is an exemplary flowchart for automatic data entry for form data structures using application programming interfaces, according to an embodiment.

FIG. 4 is an exemplary flowchart 400 for automatic data entry for form data structures using application programming interfaces, according to an embodiment. Note that one or more steps, processes, and methods of flowchart 400 described herein may be omitted, performed in a different sequence, or combined as desired or appropriate.

At step 402 of flowchart 400, an onboarding API with a partner service is established to exchange onboarding data. The onboarding API may be established by a service provider and for the partner service may correspond to an API endpoint used by the partner service to exchange API calls, such as by executing an API call to the onboarding API endpoint used to communicate data for a referral of one or more potential customer entities to the service provider by the partner service. Thus, the API endpoint for the partner service may allow specific data for the partner service to be communicated and/or converted for use by the service provider with onboarding attempts by the potential customer entities.

At step 404, entity data associated with organization and/or onboarding parameter for an entity are received via the API. The entity data may correspond to referral data, such as data processed and/or received by the partner service when services have been provided to the entity (e.g., incorporation, tax, financial, or other services). Entity data may therefore be provided from one or more documents provided by and/or based on one or more services provided to the entity by the partner service, which may also be relevant to the service provider when onboarding the entity for services provided by the service provider to the entity (e.g., account, credit and underwriting, expense management, and the like). At step 406, the entity data is converted for use with an onboarding system and the API for digital form filling. The conversion of the data may be for specific data formats and structures required for automatic form filling, such as when storing and/or entering the data to one or more data fields of a digital form and/or interface for the digital form.

At step 408, the converted data is automatically associated, without user input, with a digital form and/or data fields and elements for the digital form. This may include entering the data into a form that is storable for the converted entity data in a database or the like. In some embodiments, the data may be associated with particular data fields for the digital form that may be later used to fill data within data fields of the digital form. In other embodiments, a digital form may be intelligently prefilled, such as using a machine learning (ML) model, with the converted data and/or data structures for the converted data. Thus, a form may be prefilled with, and/or the converted data and/or data structures may be associated with, corresponding data fields within a digital form.

Once a form is automatically filled and/or the converted data is associated with the digital form, at step 410, an accessible data structure for the converted data and/or digital form is stored. This may include storing a data structure for the converted data that is associated with particular fields and elements of the digital form. In other embodiments, a prefilled form may be generated with the converted data in data fields, and a data structure for that form may be stored. At step 412, a message for access to the digital form via the accessible data structure is communicated, such as to an entity's digital address (e.g., email address, dashboard within another website or application, or the like). In some embodiments, the message may be sent by the service provider; however, the message may also or instead be sent by the partner service performing the referral.

Thus, using various embodiments discussed herein, companies can better (e.g., more efficiently and more accurately) automatically perform data entry into data fields and elements, which eliminates the need for manual data entry within these fields and elements. Further, this may expedite the data processing and inputs required to complete digital forms with services providers. The provided API integrations and endpoints provided herein therefore improve data communications and processing between separate computing systems for different service providers, thereby unifying data across different platforms and utilizing validated data that reduces risk analysis processing.

Figure 5:
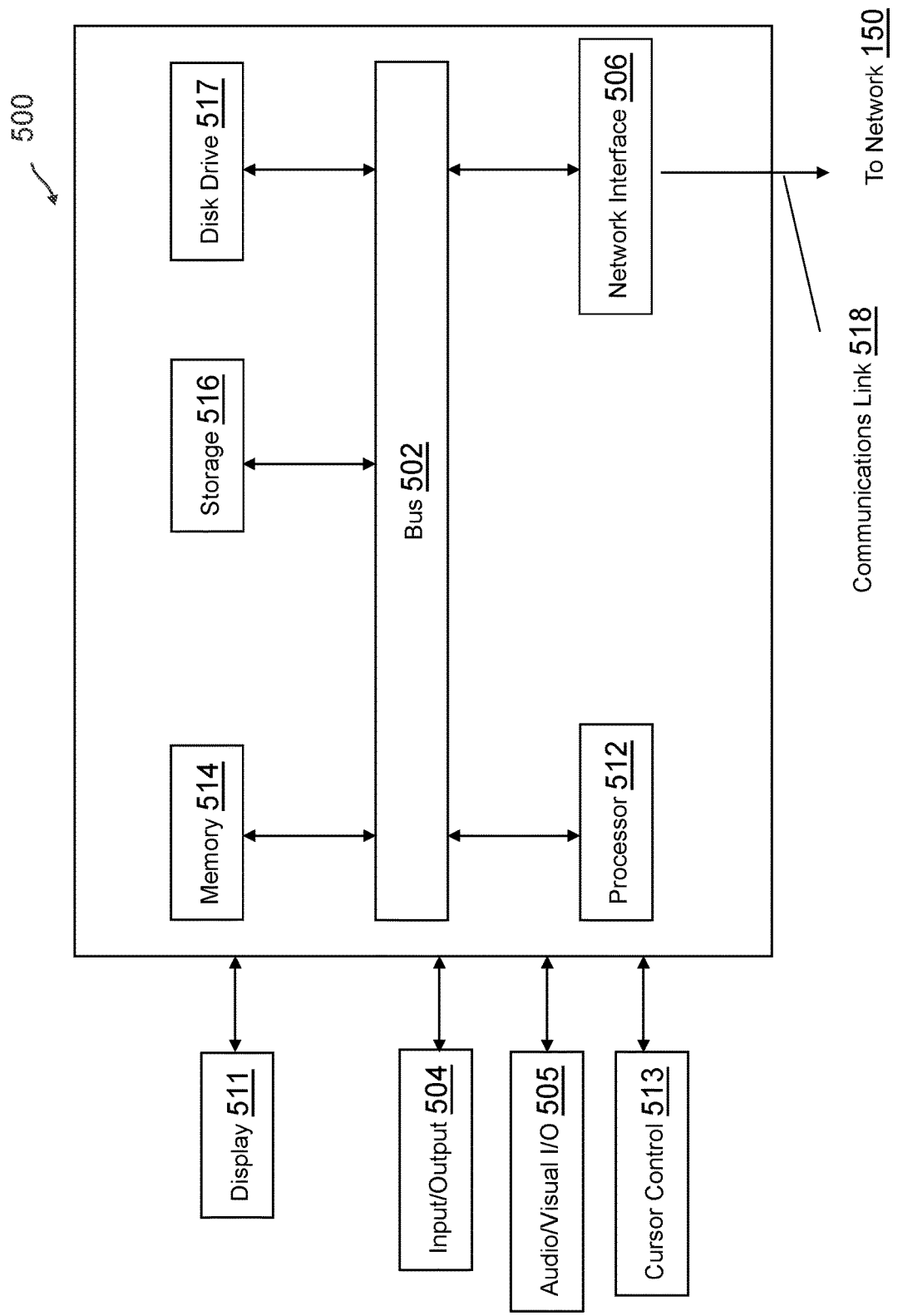
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing system comprising:
a non-transitory memory storing instructions; and
one or more hardware processors coupled to the non-transitory memory and configured to read the instructions from the non-transitory memory to cause the computing system to perform operations comprising:
   accessing company organizational data for a company provided by a partner service provider via an application programming interface (API) call to a public API of the computing system;
   generating a data structure comprising the company organizational data, the data structure usable with a digital form for an onboarding of the company for at least one of a digital card service or an expense management service;
   storing the data structure for the company organizational data with an identifier associated with the company;
   loading, in response to a request to access the data structure from a representative associated with the company, the company organizational data to a form data structure for the digital form using the stored data structure, wherein the loading comprises inputting, independent of user input by the representative, the company organizational data from the partner service provider to the digital form;
   requesting a completion of the digital form with the computing system by the representative;
   receiving additional input for the completion of the digital form; and
   processing the form data structure for the digital form based on the company organizational data and the additional input for the completion of the digital form.

2. The computing system of claim 1, wherein the generating the data structure comprises converting the company organizational data in a first data format from the partner service provider to a second data format for the data structure stored for the company organizational data with the identifier by the computing system.

3. The computing system of claim 1, wherein the partner service provider comprises a connected server that aggregates the company organizational data for the company during a service provided to the company, and wherein prior to the accessing, the operations further comprise:
   receiving, from the connected server, a company organizational document or a company formational document for the company that includes the company organizational data.

4. The computing system of claim 3, wherein prior to the accessing, the operations further comprise:

parsing, using an image processing operation, the company organizational document or the company formational document; and extracting the company organizational data based on the parsing.

5. The computing system of claim 1, wherein, prior to the loading, the operations further comprise:

determining a partner data trust level associated with the partner service provider; and increasing or decreasing a trust score for the company organizational data based on the partner data trust level, wherein the trust score is stored with the data structure for the company organizational data.

6. The computing system of claim 5, wherein the loading, in response to the request to access the data structure from the representative associated with the company, is only performed if the trust score meets or exceeds a threshold trust score.

7. The computing system of claim 1, where the company organizational data is a portion of onboarding data required for the onboarding of the company using the digital form, and wherein the requesting the completion of the digital form comprises requesting additional financial data required in order to complete the onboarding.

8. The computing system of claim 1, wherein the public API is connectable with a partner API of the partner service provider that is configured to exchange API calls between the public API and the partner API for automatic exchange of company documents based on an API agreement.

9. A method comprising:

accessing, by a computing system, company organizational data for a company provided by a partner service provider via an application programming interface (API) call to a public API of the computing system;

generating a data structure comprising the company organizational data, the data structure usable with a digital form for an onboarding of the company for at least one of a digital card service or an expense management service;

storing the data structure for the company organizational data with an identifier associated with the company;

loading, in response to a request to access the data structure from a representative associated with the company, the company organizational data to a form data structure for the digital form using the stored data structure, wherein the loading comprises inputting, independent of user input by the representative, the company organizational data from the partner service provider to the digital form;

requesting a completion of the digital form with the computing system by the representative;

receiving additional input for the completion of the digital form; and processing the form data structure for the digital form based on the company organizational data and the additional input for the completion of the digital form.

10. The method of claim 9, wherein the generating the data structure comprises converting the company organizational data in a first data format from the partner service provider to a second data format for the data structure stored for the company organizational data with the identifier by the computing system.

11. The method of claim 9, wherein the partner service provider comprises a connected server that aggregates the company organizational data for the company during a service provided to the company, and wherein prior to the accessing, the method further comprises:

receiving, from the connected server, a company organizational document or a company formational document for the company that includes the company organizational data.

12. The method of claim 11, wherein prior to the accessing, the method further comprises:

parsing, using an image processing operation, the company organizational document or the company formational document; and extracting the company organizational data based on the parsing.

13. The method of claim 9, wherein, prior to the loading, the method further comprises:

determining a partner data trust level associated with the partner service provider; and increasing or decreasing a trust score for the company organizational data based on the partner data trust level, wherein the trust score is stored with the data structure for the company organizational data.

14. The method of claim 13, wherein the loading, in response to the request to access the data structure from the representative associated with the company, is only performed if the trust score meets or exceeds a threshold trust score.

15. The method of claim 9, where the company organizational data is a portion of onboarding data required for the onboarding of the company using the digital form, and wherein the requesting the completion of the digital form comprises requesting additional financial data required in order to complete the onboarding.

16. The method of claim 9, wherein the public API is connectable with a partner API of the partner service provider that is configured to exchange API calls between the public API and the partner API for automatic exchange of company documents based on an API agreement.

17. A non-transitory machine-readable medium having stored thereon machine-readable instructions executable to cause a machine to perform operations comprising:

accessing company organizational data for a company provided by a partner service provider via an application programming interface (API) call to a public API associated with the machine;

generating a data structure comprising the company organizational data, the data structure usable with a digital form for an onboarding of the company for at least one of a digital card service or an expense management service;

storing the data structure for the company organizational data with an identifier associated with the company;

loading, in response to a request to access the data structure from a representative associated with the company, the company organizational data to a form data structure for the digital form using the stored data structure, wherein the loading comprises inputting, independent of user input by the representative, the company organizational data from the partner service provider to the digital form;

requesting a completion of the digital form by the representative;

receiving additional input for the completion of the digital form; and processing the form data structure for the digital form based on the company organizational data and the additional input for the completion of the digital form.

18. The non-transitory machine-readable medium of claim 17, wherein the generating the data structure comprises converting the company organizational data in a first data format from the partner service provider to a second data format for the data structure stored for the company organizational data with the identifier.

19. The non-transitory machine-readable medium of claim 17, wherein the partner service provider comprises a connected server that aggregates the company organizational data for the company during a service provided to the company, and wherein prior to the accessing, the operations further comprise:

receiving, from the connected server, a company organizational document or a company formational document for the company that includes the company organizational data.

20. The non-transitory machine-readable medium of claim 19, wherein prior to the accessing, the operations further comprise:

parsing, using an image processing operation, the company organizational document or the company formational document; and extracting the company organizational data based on the parsing.

\* \* \* \* \*